March 7, 1950         J. H. MADDEN         2,499,401
JET-PROPELLED AIRCRAFT WITH TILTABLE JET UNITS
Filed June 28, 1946                    2 Sheets-Sheet 1
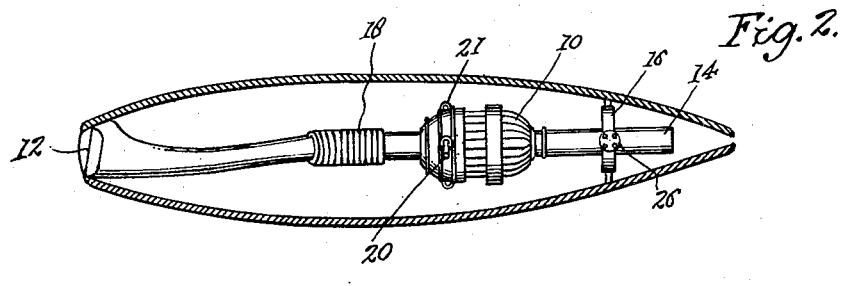
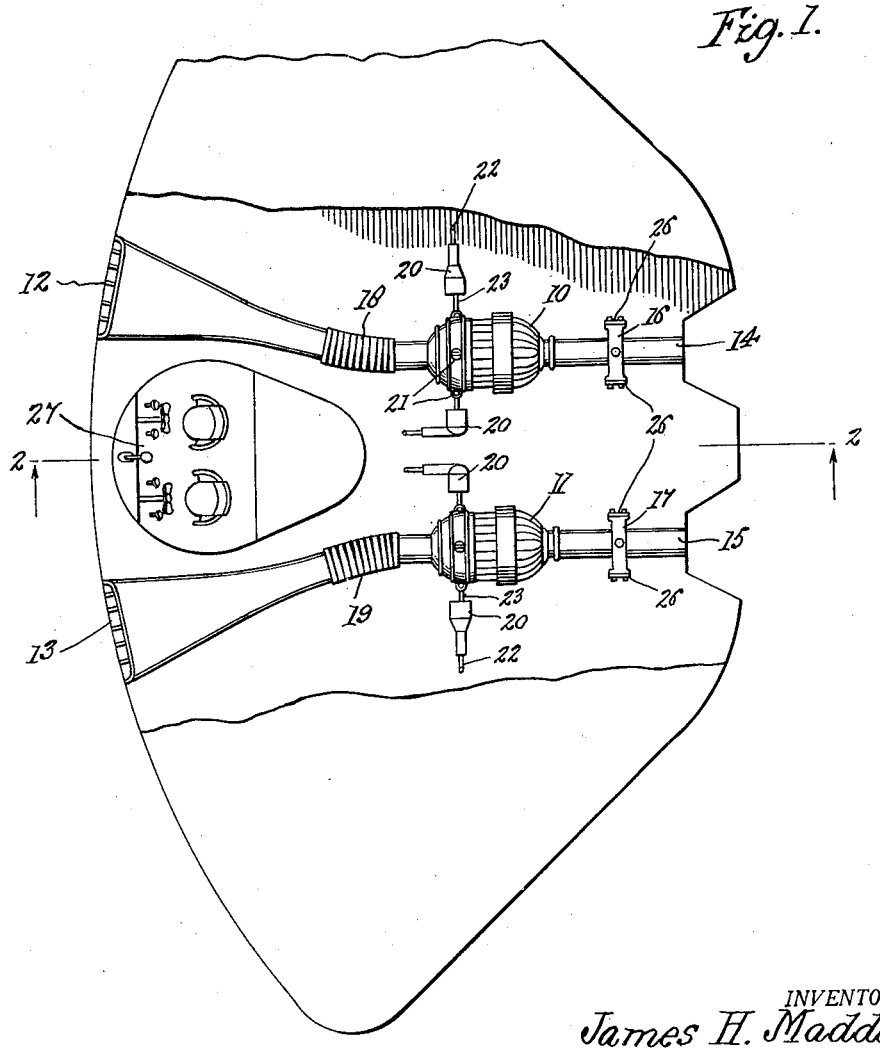
INVENTOR.
James H. Madden
BY Frank C. Maley
Agent

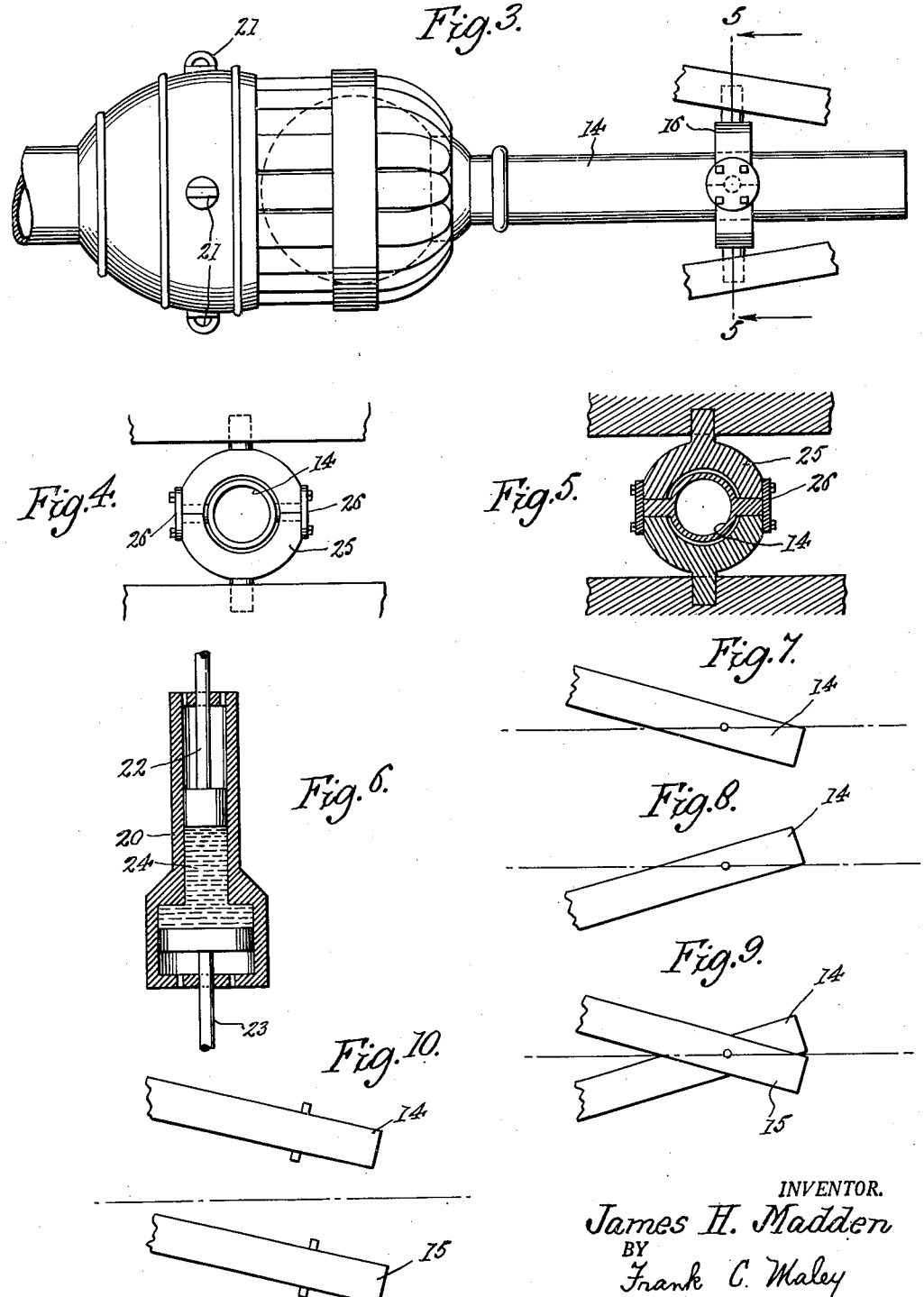

Patented Mar. 7, 1950

2,499,401

UNITED STATES PATENT OFFICE 2,499,401

JET-PROPELLED AIRCRAFT WITH TILTABLE JET UNITS

James H. Madden, St. Paul, Minn.

Application June 28, 1946, Serial No. 680,310

2 Claims. (Cl. 244—52)

The present invention relates to reaction power control for aircraft and has particular relation to means whereby aircraft utilizing the reaction type of motor may be steered and otherwise controlled whether the craft be at the customary lower altitudes or at extremely high altitudes.

It is, accordingly, an object of the inventtion to provide means whereby a reaction powered aircraft may be positively controlled with a minimum of effort.

A further object of the invention is the elimination of the necessity for ailerons, elevators and rudders and a simplification of the control system in aircraft powered by reaction motors.

A further object of the invention is the provision of novel means for accomplishing the aforementioned objects.

It is to be understood, in the following specification, that wherever the expression "reaction motor" is used that such expression shall include jet type, rocket type and impulse type motors; in other words, the "reaction motor" coming within the type, is a motor in which the burning of fuel is not continuous but which takes place in a very rapid cycle, an example of the type is that used in the German V-1 bomb used in World War II.

It is also to be understood, in the following specification, that wherever the expression "jet tube" is used that such expression shall include any type of tube or opening by which the reaction gases are released.

Other and further objects will become apparent from a reading of the following specification taken in conjunction with the drawings, in which:

Figure 1 is a plan view, partly broken away, of an embodiment of the invention in use in a flying wing type of aircraft.

Figure 2 is a sectional view taken substantially along line 2—2 of Figure 1,

Figure 3 is a side elevational view of a reaction motor and the universal assembly mounted on the jet tube, Figure 4 is a reduced elevational view of the universal assembly shown in Figure 3, Figure 5 is an elevational sectional view of the detail of the universal assembly, Figure 6 is a sectional view of a hydraulic pump used for control, and Figures 7 to 10 inclusive are exaggerated representations of the various positions that two jet tubes may take in the ordinary control of an aircraft having the present invention incorporated therein.

Referring more particularly to the drawings, there is shown therein a preferred embodiment of the invention incorporated in a flying wing type of aircraft wherein two jet type reaction motors 10 and 11 are mounted and in which each is provided with an air intake tube 12 and 13, respectively and a jet tube 14 and 15 respectively. It will be seen that the tubes 14 and 15 are respectively mounted in universal assemblies 16 and 17 and that the motors 10 and 11 are connected with the air intake tubes 12 and 13 by means of flexible tubings 18 and 19, respectively.

The motors 10 and 11 are each adapted to be moved by means of hydraulic pumps 20 of which, in the preferred embodiment, four are provided for each of the motors. Standard controls are provided in the pilot's compartment 27 for moving the small pistons 22 in the hydraulic pumps 20.

Reference to Figure 6 will disclose one form the hydraulic control may take. It will be readily apparent that the pilot controls the movement of the smaller piston 22 and that the movement of this piston will cause a corresponding movement of a larger piston 23 through the means of the fluid medium 24. Movement of the larger piston 23, which is attached to the motors 10 and 11 by means of the lugs 21, moves the motors 10 and 11 in the desired direction.

Reference to Figures 4 and 5 will disclose details of the construction of the universal assemblies wherein there is provided a split gimbal ring 25 which is held together by gimbal ring side plates 26. The gimbal 25 is mounted in a structural part of the aircraft and will allow for universal movement of the jet tube 14.

Reference to Figures 7 to 10 inclusive, will disclose various positions (exaggerated from the normal for the purpose of illustration) which the jet tubes may take in order to accomplish certain particular maneuvers in an aircraft such as hereafter described. In Figure 7 there is shown a side view of the tubes as they would appear when the pilot has set them to cause the plane to dive. In Figure 8 there is disclosed a side view of the tubes as they would appear when the pilot has moved the controls so as to cause the aircraft to climb. In Figure 9 there is shown a side view of the tubes as they would appear when the pilot has moved the controls in such a manner as to cause the aircraft to bank. In Figure 10 there is shown a plan view of the tubes as they would appear when the pilot has moved the controls in such a manner as to cause the aircraft to turn. In other words, in Figures 7 and 8 the tubes are so controlled as to take the place of elevators normally utilized in aircraft; in Figure 9 the tubes are so controlled as to take the place of ailerons normally used to cause banking in a plane and in Figure 10 the tubes are shown in a position wherein they are causing the identical effect caused by movement of the rudder utilized in ordinary aircraft.

In operation, it will be apparent that the pilot may cause the movement of either motor 10 or 11 in any direction desired by controlling the movement of the pistons 22 and in turn, through the fluid 24 and pistons 23 move the motors 10 and 11, thereby causing a corresponding movement in a reverse direction of the tubes 14 and 15 within the universal assemblies 16 and 17, respectively.

As will be understood, each of the two units shown swing bodily relative to the axis of the universal assembly 26, the swinging movement being pivotal relative to such axis selectively in either a vertical or a horizontal plane through such axis, the vertical plane being individual to the unit while the horizontal plane is common to both units. Since assembly 26 is located in a mid-zone of the length of the jet tubes, the actual swing of the discharge end of the tube is relatively small physically, but since the axis of the unit will swing bodily on the assembly axis, the direction of discharge from the tube will accord with that of the swung unit axis and therefore in the proper direction to secure the desired steering action, while retaining the range of swinging movement of the tube discharge end within small limits and thus not materially affect the relation of the jets to the width of the aircraft.

While the range of shifting movement of the discharge ends of the tubes is small, this does not materially affect the ability to accurately control the extent of shift, since the mechanism for providing the shift is operative in connection with the motor zone of the unit with the mechanism thus located a much greater distance from the axis on which the shift is made than is the discharge end of the tube; as a result the range of shift in the mechanism zone is largely increased and therefore capable of meeting the conditions of piloting activities requiring small calibrated adjustments, since such adjustments affect the bodily swing of the unit axis, the discharge end of the tube moving through its proportional part of such axis swing.

While but one form of the invention has been shown and described herein, it will be readily apparent to those skilled in the art that many minor modifications may be made without departing from the spirit of the invention or the scope of the appended claims.

1. In an aircraft, an aircraft body, a pair of laterally spaced power units mounted in the mid-zone of the width of said body, each unit including a reaction jet motor, jet tube, and accessories, the jet tube of each of said units being supported within a respective universally tiltable support, a pair of air intake means fixed at the front end of said body, a flexible conduit connecting each of said air intake means with a respective power unit, and means for independently and selectively tilting each of said unit in any desired direction.

2. In an aircraft, an aircraft body, a power unit mounted substantially midway of the width of said body, said unit including a reaction jet motor, jet tube and accessories, the jet tube of said unit being supported within a universally tiltable support, air intake means fixed at the front end of said body, a flexible conduit connecting said air intake means with said power unit, and means for tilting said unit in any desired direction.

JAMES H. MADDEN.

REFERENCES CITED

The following references are of record in the file of this patent:

UNITED STATES PATENTS

| Number | Name | Date |
|---|---|---|
| 1,291,032 | Lesem | Jan. 14, 1919 |
| 1,742,461 | Cuddy | Jan. 7, 1930 |
| 1,788,218 | Wettstein | Jan. 6, 1931 |
| 2,396,568 | Goddard | Mar. 12, 1946 |